(12) United States Patent
Lee et al.

(10) Patent No.: US 10,809,793 B2
(45) Date of Patent: Oct. 20, 2020

(54) POWER CONTROL METHOD AND APPARATUS FOR LOW POWER SYSTEM OF ELECTRONIC DEVICE

(71) Applicant: Samsung Electronics Co., Ltd., Suwon-si, Gyeonggi-do (KR)

(72) Inventors: Suhho Lee, Seongnam-si (KR); Myungchul Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 126 days.

(21) Appl. No.: 15/128,716

(22) PCT Filed: Mar. 30, 2015

(86) PCT No.: PCT/KR2015/003089
§ 371 (c)(1),
(2) Date: Sep. 23, 2016

(87) PCT Pub. No.: WO2015/152578
PCT Pub. Date: Oct. 8, 2015

(65) Prior Publication Data
US 2017/0108917 A1    Apr. 20, 2017

(30) Foreign Application Priority Data
Mar. 31, 2014   (KR) .................. 10-2014-0037706

(51) Int. Cl.
*G06F 1/3296* (2019.01)
*G06F 1/26* (2006.01)
(Continued)

(52) U.S. Cl.
CPC .............. *G06F 1/3296* (2013.01); *G06F 1/26* (2013.01); *G06F 13/364* (2013.01);
(Continued)

(58) Field of Classification Search
CPC ........ G06F 1/26; G06F 1/3296; G06F 13/364; G06F 13/404; G06F 13/4282; G06F 15/7807
See application file for complete search history.

(56) References Cited

U.S. PATENT DOCUMENTS 5,560,016 A * 9/1996 Fiebrich ................ G06F 13/362
710/116
5,996,037 A * 11/1999 Emnett ................ G06F 13/364
710/117
(Continued)

FOREIGN PATENT DOCUMENTS

JP        2006-004339 A    1/2006
KR    10-2010-0089345 A    8/2010
(Continued)

*Primary Examiner* — Eric T Oberly
(74) *Attorney, Agent, or Firm* — Jefferson IP Law, LLP

(57) ABSTRACT

According to one embodiment of the present invention, a system on chip (SoC) including one or more intellectual properties (IPs) and a BUS, and a power control method using the same are provided, the SoC comprising: an IP-BUS activity monitor for measuring activity based on activity information of the respective IPs, for comparing with a pre-set activity threshold and for generating a first voltage control signal for the respective IPs based on the comparison result; and a voltage regulator for supplying voltage to the respective IPs based on the generated first voltage control signal.

20 Claims, 14 Drawing Sheets

(51) Int. Cl.
*G06F 13/364* (2006.01)
*G06F 13/40* (2006.01)
*G06F 13/42* (2006.01)
*G06F 15/78* (2006.01)

(52) U.S. Cl.
CPC ........ *G06F 13/404* (2013.01); *G06F 13/4282* (2013.01); *G06F 15/7807* (2013.01)

(56) References Cited

U.S. PATENT DOCUMENTS

| | | | | |
|---|---|---|---|---|
| 6,115,823 | A * | 9/2000 | Velasco | G06F 1/3203 |
| | | | | 710/16 |
| 6,222,354 | B1 * | 4/2001 | Song | G05F 3/242 |
| | | | | 323/273 |
| 8,161,252 | B1 * | 4/2012 | Case | G06T 1/60 |
| | | | | 711/114 |
| 8,370,654 | B1 * | 2/2013 | Hasko | G06F 1/26 |
| | | | | 713/300 |
| 8,884,685 | B1 * | 11/2014 | Petrovic | G05F 1/46 |
| | | | | 327/540 |
| 9,448,122 | B2 * | 9/2016 | Chang | G01K 7/01 |
| 2005/0283626 | A1 | 12/2005 | Shikata | |
| 2007/0018864 | A1 * | 1/2007 | Khan | H03K 19/00384 |
| | | | | 341/118 |
| 2007/0255970 | A1 * | 11/2007 | Hottelet | G06F 1/3203 |
| | | | | 713/320 |
| 2008/0005596 | A1 * | 1/2008 | Sistla | G06F 1/3209 |
| | | | | 713/300 |
| 2008/0291969 | A1 * | 11/2008 | Chu | G11C 7/04 |
| | | | | 374/178 |
| 2009/0263127 | A1 * | 10/2009 | Haran | H04Q 11/0067 |
| | | | | 398/38 |
| 2010/0205467 | A1 | 8/2010 | Park | |
| 2011/0215779 | A1 * | 9/2011 | Lee | G05F 1/10 |
| | | | | 323/282 |
| 2012/0054511 | A1 | 3/2012 | Brinks et al. | |
| 2012/0102345 | A1 | 4/2012 | Park et al. | |
| 2013/0311792 | A1 * | 11/2013 | Ponnathota | G06F 1/26 |
| | | | | 713/300 |
| 2013/0311799 | A1 * | 11/2013 | Fitzpatrick | G06F 1/3296 |
| | | | | 713/320 |
| 2014/0068285 | A1 * | 3/2014 | Lee | G06F 1/324 |
| | | | | 713/300 |
| 2014/0089697 | A1 * | 3/2014 | Kim | G06F 1/26 |
| | | | | 713/320 |

FOREIGN PATENT DOCUMENTS

| | | |
|---|---|---|
| KR | 10-2010-0090513 A | 8/2010 |
| KR | 10-2012-0040819 A | 4/2012 |
| KR | 10-2013-0082152 A | 7/2013 |

* cited by examiner

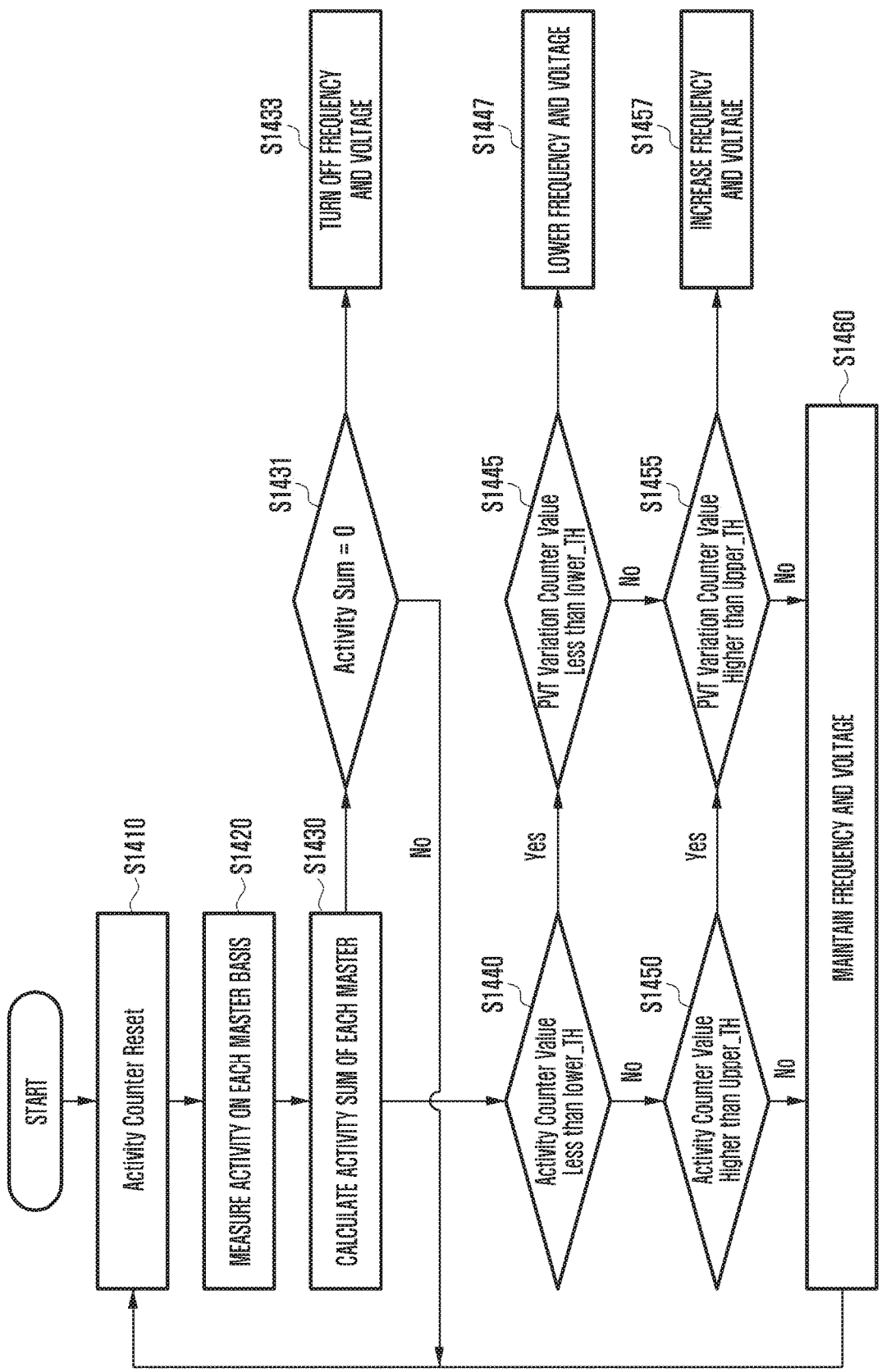

POWER CONTROL METHOD AND APPARATUS FOR LOW POWER SYSTEM OF ELECTRONIC DEVICE

TECHNICAL FIELD

The present invention relates to a method and apparatus for controlling power for a low power chip of an electronic device. The present invention relates to a method and apparatus for efficiently controlling power for a mobile System on Chip (SoC).

BACKGROUND ART

The present invention relates to a method and apparatus for efficiently controlling power of an electronic device.

Nowadays, an electronic product market has been enlarged, and a technical range thereof has become broad. Particularly, in a portable or mobile electronic product, in a process of widening a technical range thereof, it becomes an important factor that determines competitive power of a product to efficiently manage power consumption of the product.

As a method of reducing power consumption of an electronic device, various methods such as a circuit design or a process processor have been developed, and even when designing a semiconductor chip, several methods of reducing such power consumption have been considered. Particularly, in a recent mobile device market, a System on Chip (hereinafter, SoC) having less consumption power, a cheap production cost, and high reliability has been used.

A SoC is a semiconductor that processes an entire function with one chip and integrates an individual semiconductor such as a microprocessor, memory semiconductor, Digital Signal Processing chip (DSP), and microcontroller (MCU) into one chip. That is, a system implemented into several semiconductor chips on a Printed Circuit Board (PCB) is integrated into one chip and solves a calculation function, storage of data, and a change to an analog or digital signal with one chip.

The SoC absorbs various entire functions such as a processor, multimedia, graphic, an interface, and security to develop to a more complex system. With development of SoC technology, by reducing an occupying space of many chips on a PCB, a size of a product may be largely reduced, and a noise (collision phenomenon between chips) problem occurring due to separate mounting of the chips may be solved. Further, the SoC may reduce an electricity use amount consumed for information exchange between separated chips on the PCB.

Conventionally, for power management, a method of scaling a frequency in a SoC has been generally used. FIG. 1 is a block diagram illustrating a configuration of a conventional SoC used in a mobile device. Referring to FIG. 1, the SoC includes at least one master IP and at least one slave IP about a bus system. In the conventional SoC, the master IP and the slave IP give and receive data, and when the master IP reads and writes data at the slave IP, the master IP sends a req signal that requests to use a bus to the bus system. The bus system receives such a req signal and applies Dynamic Frequency Scaling (DFS) to a bus and an IP clock through a DFS controller using a value measured in an IP/BUS Activity Monitor, thereby reducing power. That is, the SoC has a structure that scales power using the same voltage and a variable frequency. However, such a SoC has less power reduction effect.

DISCLOSURE OF THE INVENTION

Technical Problem

The present invention has been made in view of the above problems and provides a method and apparatus for controlling power for a low power chip of an electronic device. The present invention further provides a method and apparatus for efficiently controlling power for a mobile SoC. The present invention further provides a method and apparatus for reducing power by measuring Process, Voltage, and Temperature (PVT) variations, measuring use frequency of each intellectual property (IP), for example a Central Processing Unit (CPU), modem, and DSP, and applying Dynamic Voltage Scaling (DVS) of each IP in an SoC of an electronic device.

Solution to Problem

In accordance with an aspect of the present invention, a System on Chip (SoC) including at least one Intellectual Property (IP) and a bus includes: an IP-BUS activity monitor that measures activity based on operation information of each IP and that compares the activity with a predetermined activity threshold value and that generates a first voltage control signal of the each IP based on a comparison result; and a voltage regulator that supplies a voltage to the each IP based on the generated first voltage control signal.

In accordance with another aspect of the present invention, a System on Chip (SoC) including at least one Intellectual Property (IP) and a bus includes: an IP-BUS activity monitor that measures activity based on operation information of each IP and that compares the activity with a predetermined activity threshold value and that generates a first voltage control signal of the each IP based on a comparison result; a voltage regulator that supplies a voltage to the each IP based on the generated first voltage control signal; and a PVT variation monitor that generates a second voltage control signal of the each IP based on a PVT (Process, Voltage, and Temperature) variation characteristic of the each IP and that transmits the generated second voltage signal to the voltage regulator.

In accordance with another aspect of the present invention, a method of controlling power of a System on Chip (SoC) including at least one Intellectual Property (IP) and a bus includes: measuring activity based on operation information of each IP; generating a first voltage control signal of the each IP based on a comparison result of the measured activity and a predetermined activity threshold value; and supplying a voltage to the each IP based on the generated first voltage control signal.

In accordance with another aspect of the present invention, a method of controlling power of a System on Chip (SoC) including at least one Intellectual Property (IP) and a bus includes: measuring activity based on operation information of each IP; generating a first voltage control signal of the each IP based on a comparison result of the measured activity and a predetermined activity threshold value; generating a second voltage control signal of the each IP based on a PVT (Process, Voltage, and Temperature) variation characteristic of the each IP; and supplying a voltage to the each IP based on the generated first voltage control signal and second voltage control signal.

Advantageous Effects of Invention

According to an exemplary embodiment of the present invention, a method and apparatus for controlling power for a low power chip of an electronic device can be provided. Further, according to an exemplary embodiment of the present invention, a method and apparatus for efficiently controlling power for a mobile SoC can be provided.

Further, according to an exemplary embodiment of the present invention, a method and apparatus for controlling power using Dynamic Voltage Scaling (DVS) as well as Dynamic Frequency Scaling (DFS) can be provided.

Further, according to an exemplary embodiment of the present invention, DVS technology can be applied to each IP of a chip. Further, according to an exemplary embodiment of the present invention, a method of applying an optimal voltage by monitoring Process, Voltage, and Temperature (PVT) variations can be provided.

Further, according to an exemplary embodiment of the present invention, a method of controlling a voltage of each IP by housing a voltage regulator in an external Power Management Integrated Circuit (PMIC) within a SoC can be provided.

BRIEF DESCRIPTION OF THE DRAWINGS

FIG. 14 is a flowchart illustrating a voltage scaling operation based on the SoC of FIG. 13.

MODE FOR THE INVENTION

Hereinafter, various exemplary embodiments will be described in detail with reference to the accompanying drawings. The same reference numbers are used throughout the drawings to refer to the same or like parts. Further, detailed descriptions of well-known functions and structures incorporated herein may be omitted to avoid obscuring the subject matter of the present invention. In the following description, only a portion necessary for understanding operation according to various exemplary embodiments of the present invention may be described, and a description of other portions may be omitted to avoid obscuring the subject matter of the present invention.

An exemplary embodiment of the present invention relates to a digital system using for an electronic device. The digital system may be a System on Chip (hereinafter, SoC).

First, a problem of a conventional system using Dynamic Frequency Scaling (hereinafter, DFS) and effects of the present invention will be described with reference to FIGS. 1 to 4. When using a frequency scaling method, power saving efficiency is deteriorated, compared with when using voltage scaling. Consumption power is proportional to a frequency and is proportional to the voltage square. Therefore, Dynamic Voltage Scaling (hereinafter, DVS) is more efficient than DFS.

Figure 2:
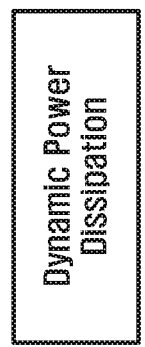
FIG. 2 is a diagram illustrating power consumption of a Complementary Metal-Oxide-Semiconductor (CMOS) circuit within a SoC.
Figure 2:
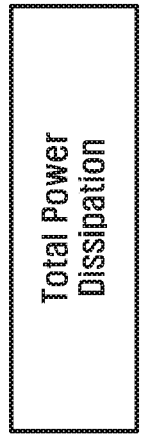
Figure 2:
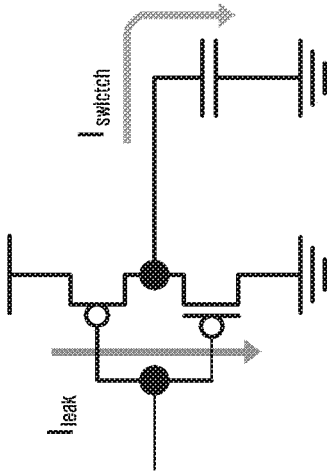

FIG. 2 is a diagram illustrating power consumption of a CMOS circuit within a SoC. Power consumption of a CMOS circuit within a SoC will be described with reference to FIG. 2 and Equations 1 to 3.

$$P_{static} = A_0 @^t V_{DD} I_{leak} dt \qquad \text{[Equation 1]}$$

$$P_{dynamic} = A_0 @^t C V_{DD}^2 f_c dt \qquad \text{[Equation 2]}$$

$$P_{total} = P_{static} + P_{dynamic} \qquad \text{[Equation 3]}$$

A total power consumption amount (Ptotal) of a CMOS within the SoC is the sum of dynamic or switch power and static power. Here, C represents loac capacitance, $V_{nn}$ represents a supply voltage, $f_c$ represents a switching clock frequency, and $I_{leak}$ represents a leakage current. Energy is calculated in a sequential integral form of power. Referring to Equations 1 and 2, in dynamic power of Equation 2, a supply voltage $V_{nn}$ has a great influence on power in a square form and has an influence on static power of Equation 1. However, a clock frequency $f_c$ has no influence on static power and is influenced less than a supply voltage even in dynamic power. Therefore, in the SoC, in order to reduce power, a conventional clock frequency $f_c$ should be scaled and a supply voltage $V_{nn}$ should be appropriately scaled and supplied.

Figure 1:
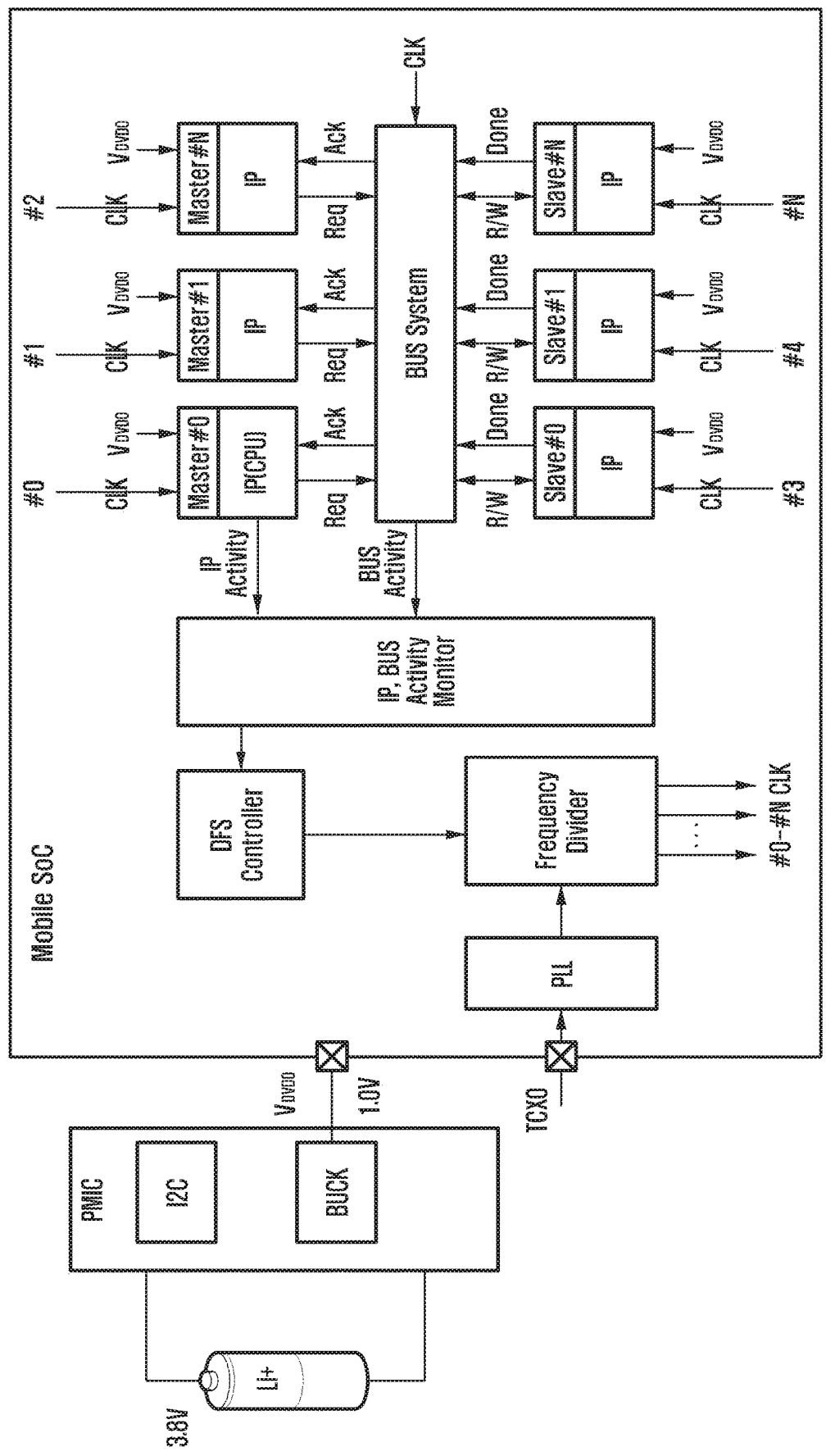
FIG. 1 is a block diagram illustrating a conventional SoC and voltage regulator.

A conventional SoC structure of FIG. 1 measures activity of a system bus and controls a clock of an entire bus system based on the activity and thus uses a method of reducing power of most intellectual property (IP) using a bus clock as well as a bus system. That is, a power reduction range is limited to power reduction by a frequency of a bus clock. Further, the conventional SoC structure has a structure that cannot perform voltage scaling according to a Process, Voltage, and Temperature (PVT).

Further, referring to FIG. 1, because a power source of a master IP and a slave IP connected to the BUS System is connected to one voltage regulator, DVS cannot be applied to each IP.

Figure 3:
FIG. 3 is a graph illustrating power consumption of a conventional system using DFS.

FIG. 3 is a graph illustrating power consumption of a conventional system using DFS. Referring to FIG. 3, because a power source of the master IP and the slave IP is connected to one voltage regulator, it can be seen that the same voltage is supplied. Because the same voltage is supplied to an entire IP and a voltage may not be scaled on an IP basis, a magnitude of a supplied voltage is large, compared with a magnitude of a requiring voltage of each IP. Therefore, a wasted power amount is large.

Further, at a conventional SoC structure of FIG. 1, a voltage regulator is located at a Power Management IC (PMIC) at the outside of a SoC. In this case, the SoC structure is set in software using a voltage regulator I2C at the external PMIC and generates a desired output voltage. Therefore, in an electronic device, because a desired output voltage is not generated at a desired time point (due to a delay time), the conventional SoC structure has a structure difficult to apply DVS, and even if DVS is applied thereto, the conventional SoC structure has a low power reduction rate.

Figure 4:
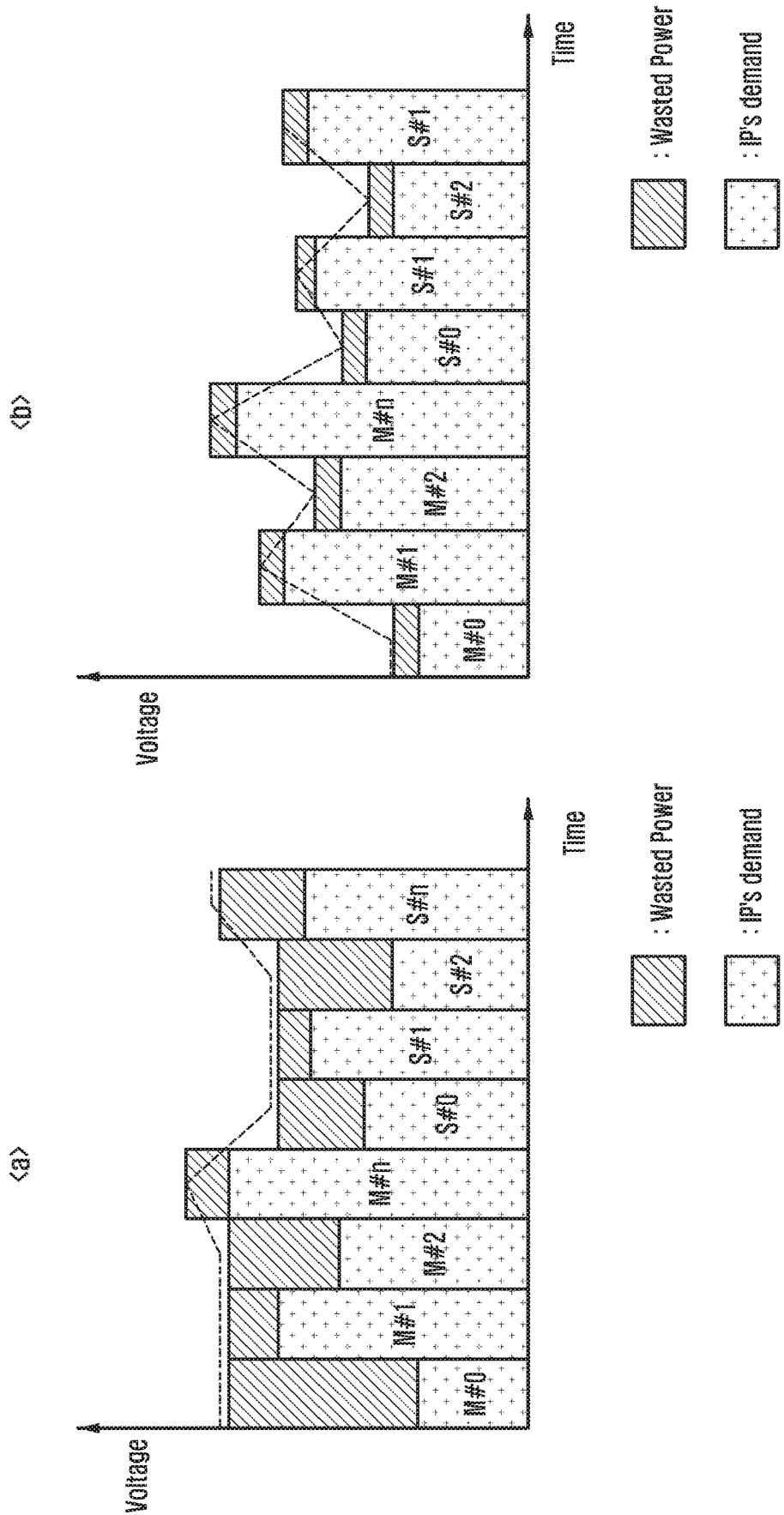
FIG. 4 is a graph illustrating a voltage change according to a location of a voltage regulator.

FIG. 4 is a graph illustrating a voltage change according to a location of a voltage regulator. FIG. 4A is a graph illustrating a voltage change when a voltage regulator is located at the outside of the SoC, as shown in FIG. 1. When the voltage regulator is located at the outside of the SoC, because a desired output of voltage may not be generated at a desired time point, a voltage greater than a requiring voltage of each IP is input. However, FIG. 4B is a graph illustrating a voltage change when a voltage regulator according to an exemplary embodiment of the present invention is included within the SoC or is mounted in the SoC. In FIG. 4B, at a desired time point corresponding to a request voltage of each IP, because a voltage may be changed (a time taken for changing a supply voltage is relatively short, compared with when the voltage regulator is located at the outside), a magnitude of a request voltage of each IP and a magnitude of a supply voltage are similar. Therefore, due to a less power consumption amount, compared with a case in which the voltage regulator is located at the outside, energy efficiency is excellent.

FIGS. 5 to 14 are diagrams illustrating a configuration and operation of a SoC according to an exemplary embodiment of the present invention. The SoC according to the present exemplary embodiment can overcome a problem that is not solved in a BUS system and DFS technology based on an IP in an existing mobile SoC. According to an exemplary embodiment of the present invention, by newly applying a PVT Variation Monitor and an IP Activity Monitor for a low power SoC, activity of each IP can be measured. Further, an optimal voltage can be supplied at a desired time point according to whether activity of each IP exists using a housed voltage regulator. By stopping power supply to an IP that does not operate, power consumption can be minimized.

Each exemplary embodiment described in the following description may independently operate and may operate in combination.

According to a first exemplary embodiment of the present invention, a method of scaling a voltage magnitude based on activity of an IP and bus system will be described. In the first exemplary embodiment of the present invention, when it is necessary that at least one master IP transmits data to another slave IP, the master IP may transmit a Bus Req, which is a use request message to the bus system. The master IP and the slave IP may be referred to as a function block. An intellectual property (IP) may be a function block mounted in the SoC to perform a specific function. For example, the IP may be a function block that performs a specific function of a CPU, DSP, and MODEM. The bus system may transmit Bus Acknowledge (Ack) in consideration of a bus state. When the master IP receives a Bus Ack signal, data transmission and reception may be performed between the master IP and the slave IP. In this case, the bus activity monitor may measure activity of the IP and bus system. In this case, the bus activity monitor may measure activity of each IP and a bus system. The bus activity monitor may scale a voltage magnitude of each IP based on measured activity information.

According to a second exemplary embodiment of the present invention, a method of scaling a voltage based on a PVT will be described. In the second exemplary embodiment of the present invention, an optimal voltage may be provided to each function block through a PVT variation monitor. A MOS type may be determined according to a MOS process characteristic of each IP, and a MOS corner corresponding to each MOS type may be determined. The PVT variation monitor may scale a voltage magnitude of each IP based on a PVT variation count.

A third exemplary embodiment of the present invention illustrates a method of scaling a voltage based on a location of a voltage regulator. By housing a voltage regulator within a Power Management IC (PMIC) existing at the outside of a SoC in an existing apparatus within the SoC, a voltage may be scaled. Each IP may be controlled with variable Dynamic Voltage Scaling (DVS) at a desired time point using a housed voltage regulator.

As described above, each exemplary embodiment may independently operate and may operate in combination.

Figure 5:
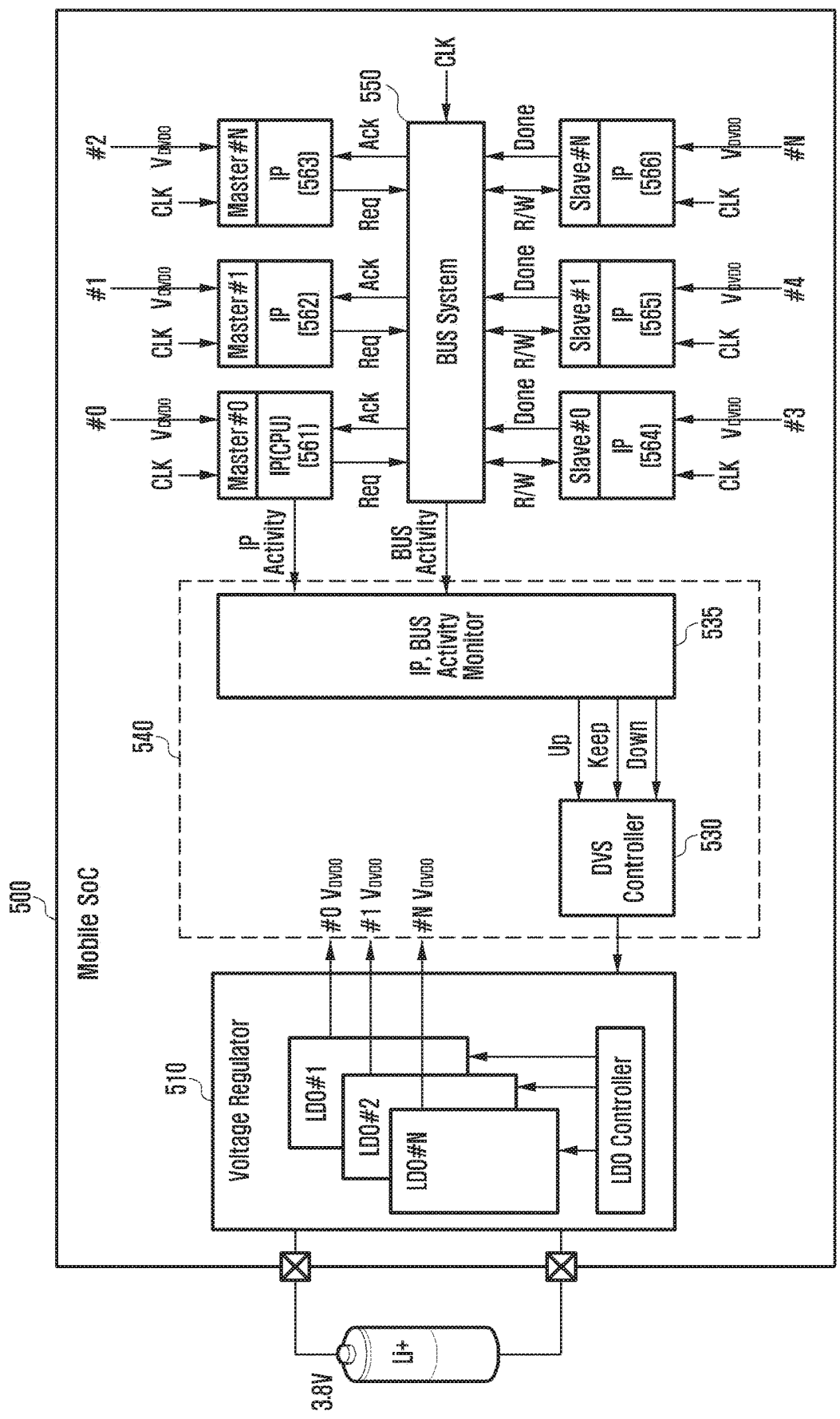
FIG. 5 is a block diagram illustrating a configuration of a SoC according to an exemplary embodiment of the present invention.

FIG. 5 is a block diagram illustrating a configuration of a SoC according to an exemplary embodiment of the present invention. FIG. 5 illustrates an exemplary embodiment based on the combination of the first exemplary embodiment and the third exemplary embodiment. Referring to FIG. 5, a SoC according to the present exemplary embodiment will be described in detail. A SoC 500 may include a voltage regulator 510, controller 540, bus system 550, and a plurality of function blocks 560: 561-566.

By scaling power input from an external power source, the voltage regulator 510 may supply power to each element included in the SoC 500. The voltage regulator 510 may supply a voltage of a magnitude appropriate to each function block to each function block 560. As shown in FIG. 5, the voltage regulator 510 may be housed in the SoC 500. The voltage regulator 510 may be physically included in the SoC 500. In the following each exemplary embodiment, a SoC including the voltage regulator 510 will be described, but the present invention is not limited thereto. That is, the present exemplary embodiment illustrates an effect of a case in which the voltage regulator 510 is physically included in the SoC 500 and it is not necessary that the voltage regulator 510 is always included in the SoC 500.

The controller 540 may control general operations of the SoC 500. According to an exemplary embodiment of the present invention, the controller 540 may include a Dynamic Voltage Scaling (DVS) controller 530 and an IP-BUS Activity Monitor 535. The controller 540 may receive operation information from the bus system 550 and the function block 560 and control an operation frequency and a supply voltage based on the received operation information.

The DVS controller 530 may be connected between the voltage regulator 510 and the IP-BUS Activity Monitor 535. The DVS controller 530 may transmit a signal for dynamically controlling a voltage based on information received from the IP-BUS Activity Monitor 535 to the voltage regulator 510. The dynamic voltage control signal may include a voltage increase request signal, voltage maintenance request signal, and voltage reduction request signal.

When the bus system 550 and each function block 560 transmit and receive data or operate, the IP-BUS Activity Monitor 535 may measure activity. The IP-BUS Activity Monitor 535 may scale a magnitude of a voltage supplied to the each function block 560 or the bus system 550 based on information about the measured activity. The IP-BUS Activity Monitor 535 may transmit a message for scaling a voltage magnitude.

Figure 6:
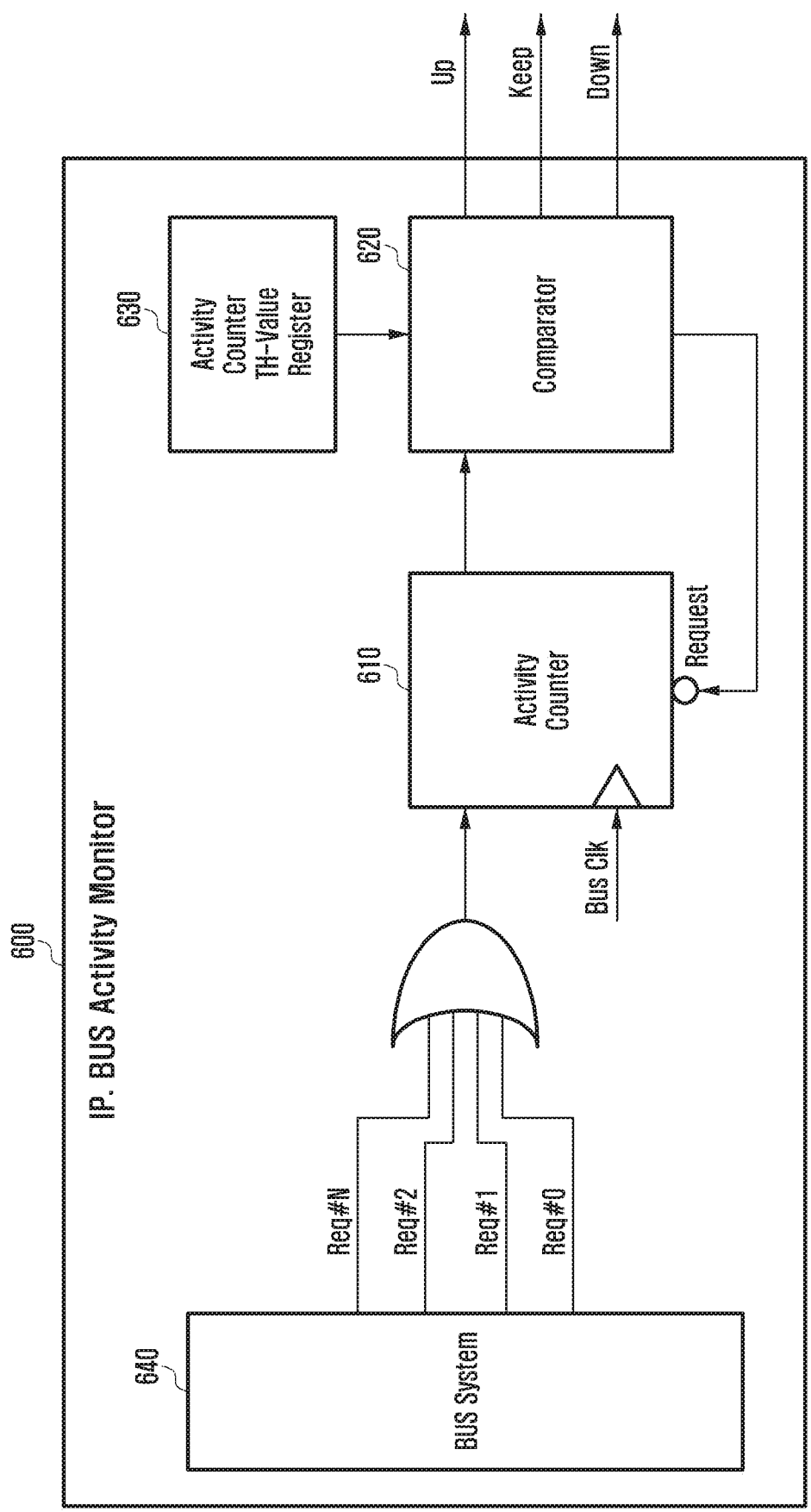
FIG. 6 is a block diagram illustrating a configuration of an IP-BUS activity monitor according to an exemplary embodiment of the present invention.

FIG. 6 is a block diagram illustrating a configuration of an IP-BUS activity monitor 600 according to an exemplary embodiment of the present invention. An activity counter 610 may receive activity information based on a bus Req of each function block from a bus system 640. Further, the activity counter 610 may receive Bus Clk information. A bus counter may transmit counted information to a comparator 620. The comparator 620 may compare information received from the activity counter 610 and a value of an activity counter threshold value register 630 and control a voltage magnitude of each function block.

Returning again to FIG. 5, the function block 560 may include master IPs 561, 562, and 563 and slave IPs 564, 565, and 566. The function block 560 performs each function for operation of the SoC and operates using a separate clock or the bus clock. For example, the function block may include a modem, memory controller, Digital Signal Processor (DSP), Universal Serial Bus (USB) controller, and Peripheral Component Interconnect (PCI) interface. For example, operation using the bus clock may include a processing of data to transmit through the bus system 550 and buffering of data transmitted and received through the bus system 550.

Figure 7:
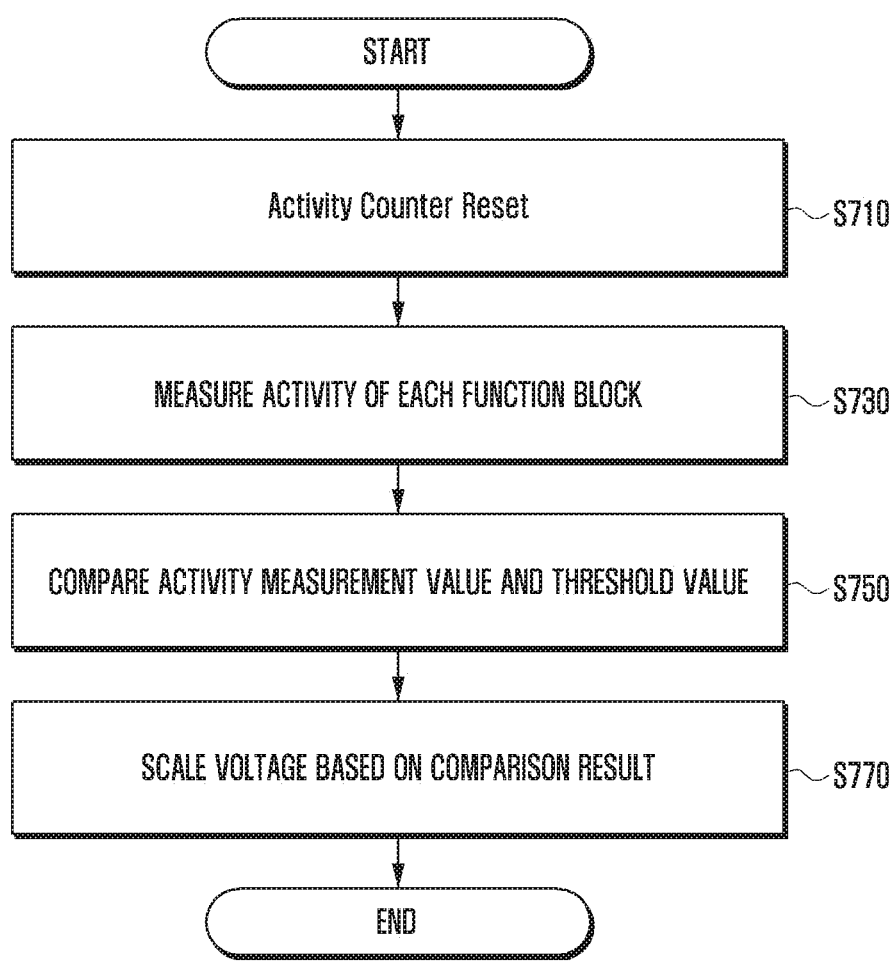
FIG. 7 is a flowchart illustrating a voltage scaling operation based on the SoC of FIG. 5.

FIG. 7 is a flowchart illustrating a voltage scaling operation based on the SoC of FIG. 5. Referring to FIG. 7, when each function block performs operation, the SoC may transmit a Bus Req. For example, when one master IP transmits data to another slave IP, the master IP may transmit a Bus Req to the bus system. The bus system may transmit Bus Acknowledge to the master IP based on a bus state. When the master IP receives a Bus Acknowledge signal from the bus system, data transmission and reception may be performed between the master IP and the slave IP.

When data transmission and reception is performed between the master IP and the slave IP, an activity counter of the IP-BUS activity monitor is reset to 0 at step S710. Each Master IP uses Bus Req signals while using a bus system.

The IP-BUS activity monitor may count a bus request value at step S730. That is, the IP-BUS activity monitor may measure activity of the each IP. Further, the IP-BUS activity monitor may calculate the weighted sum of counted activity at a predetermined cycle interval. The weighted sum calculation information may be referred to as combined activity information.

The IP-BUS activity monitor may compare an activity measurement value and a threshold value at step S750. For example, the IP-BUS activity monitor may compare the combined activity value with a predetermined threshold value. The threshold value may include a lower threshold and a high threshold.

If an activity measurement value is smaller than a lower threshold based on a comparison result, the IP-BUS activity monitor may lower a voltage, and if an activity measurement value is greater than a high threshold, the IP-BUS activity monitor may increase a voltage, and if an activity measurement value exists between a lower threshold and a high threshold, the IP-BUS activity monitor may maintain a present voltage magnitude at step S770. The IP-BUS activity monitor may transmit a control message for a voltage change to the DVS controller or the voltage regulator.

Figure 8:
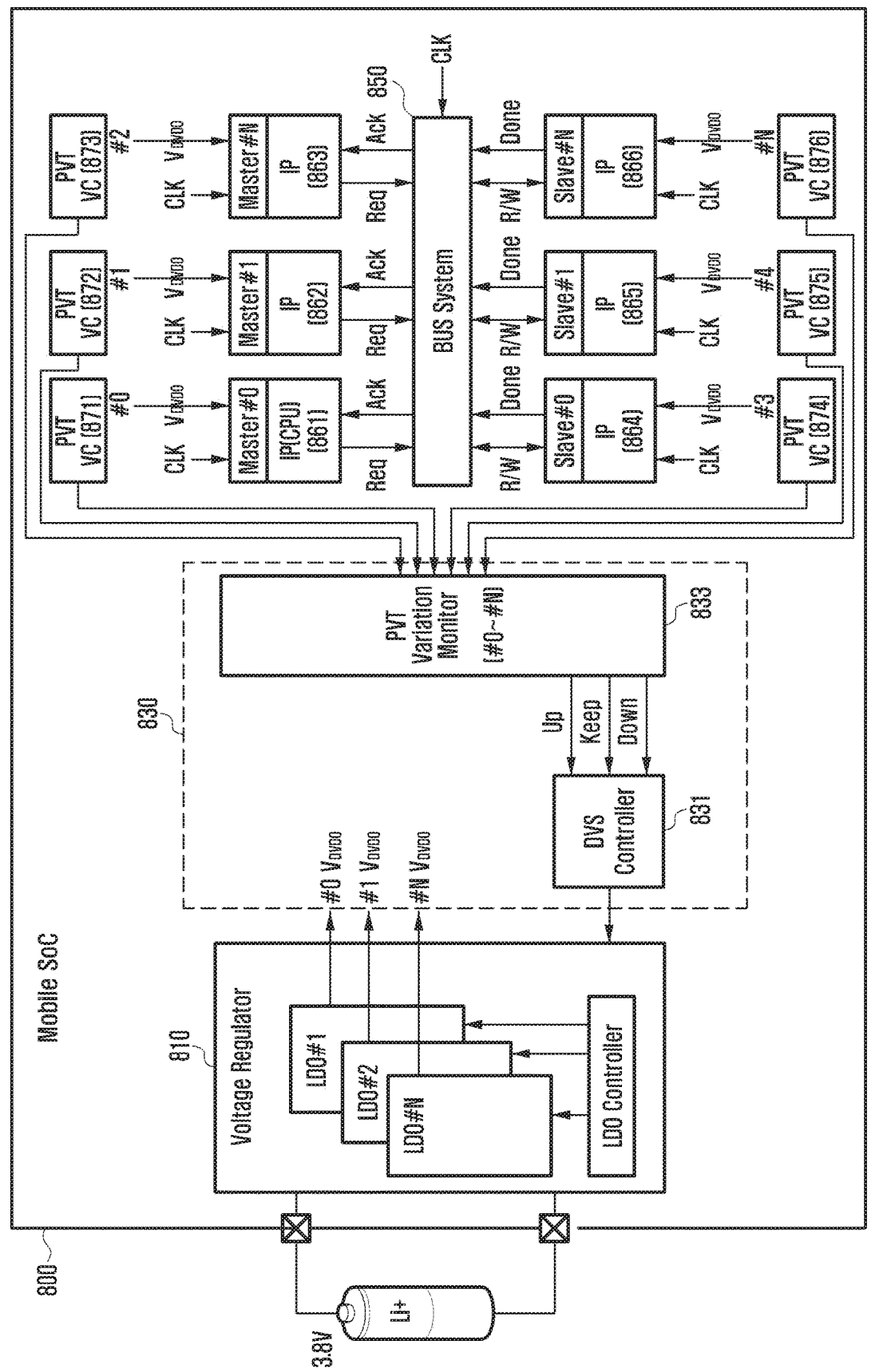
FIG. 8 is a block diagram illustrating a configuration of a SoC according to an exemplary embodiment of the present invention.
Figure 9:
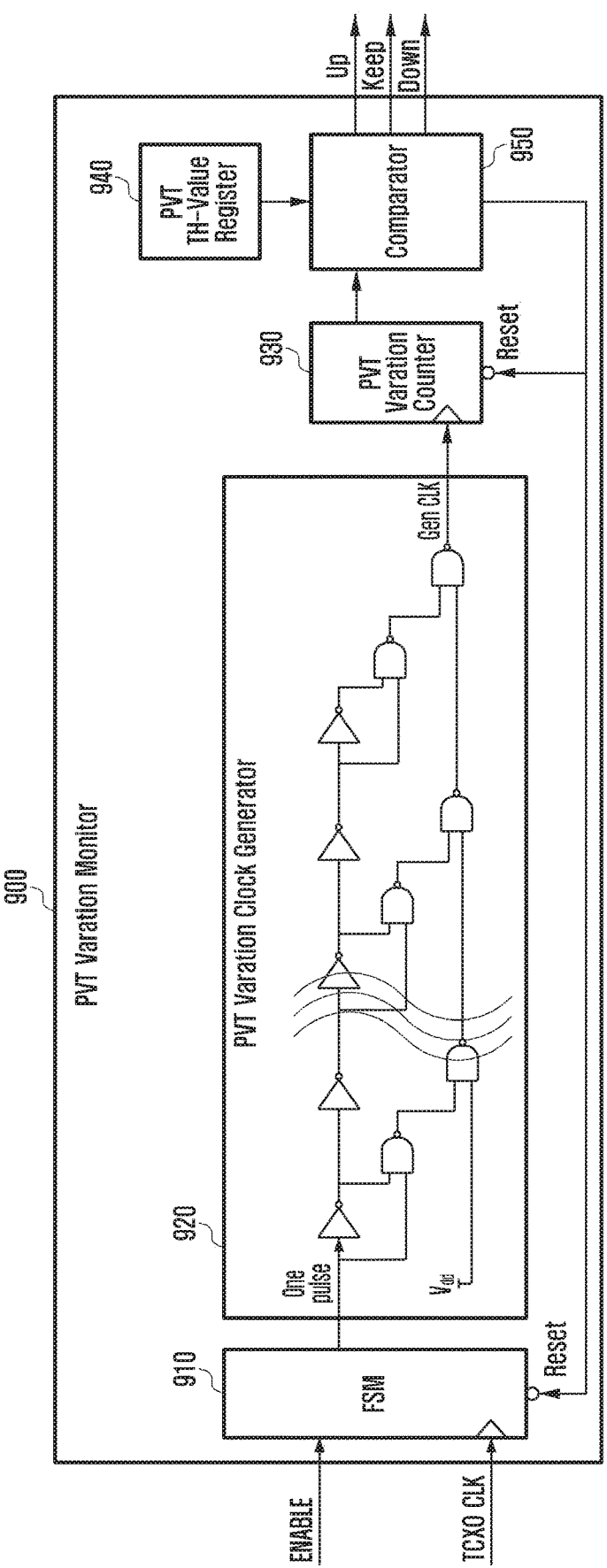
FIG. 9 is a block diagram illustrating a configuration of a PVT variation monitor according to an exemplary embodiment of the present invention.
Figure 10:
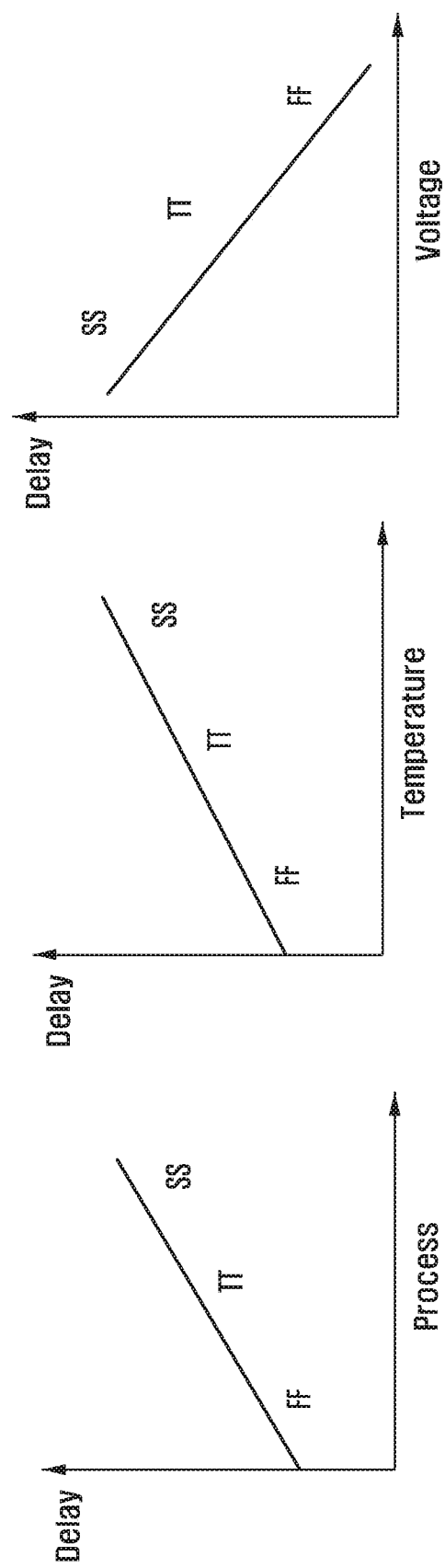
FIG. 10 is a graph illustrating a delay value change according to a PVT corner.

FIGS. 8 to 12 are diagrams illustrating a configuration and operation of a SoC according to an exemplary embodiment of the present invention. According to an exemplary embodiment, a method of providing an optimal voltage through a PVT variation monitor may be provided. FIG. 8 is a block diagram illustrating a configuration of a SoC according to an exemplary embodiment of the present invention, FIG. 9 is a block diagram illustrating a configuration of a PVT variation monitor according to an exemplary embodiment of the present invention, and FIG. 10 is a graph illustrating a delay value change according to a PVT corner.

Referring to FIG. 8, a SoC 800 may include a voltage regulator 810, controller 830, bus system 850, a plurality of function blocks 860: 861-866, and PVT variation counter 870: 871-876. The PVT variation counter 870 may be included within the controller 800 and may be formed at the outside of the controller 800. In the following description described with reference to FIG. 8, constituent elements identical to or corresponding to those of FIG. 5 are omitted.

The controller 830 may control general operations of the SoC 800. According to an exemplary embodiment of the present invention, the controller 830 may include a Dynamic Voltage Scaling (DVS) controller 831 and a PVT Variation Monitor 833. The controller 830 may receive operation information from the bus system 850 and the function block 860 and control an operation frequency and a supply voltage based on the received operation information.

The DVS controller 831 may be connected between the voltage regulator 810 and the PVT Variation Monitor 833. The DVS controller 831 may transmit a signal for dynamically controlling a voltage based on information received from the PVT Variation Monitor 833 to the voltage regulator 810. A dynamic voltage control signal may include a voltage increase request signal, a voltage maintenance request signal, and a voltage reduction request signal.

The PVT Variation Monitor 833 may measure a PVT variation. The PVT Variation Monitor 833 may measure a PVT variation using the PVT variation counter 870. The PVT Variation Monitor 833 may measure a PVT variation of each function block 860 using the PVT variation counter 870. The PVT variation may be a PVT variation counter. The PVT Variation Monitor 833 may scale a supply voltage based on a PVT variation or a PVT variation counter. The PVT Variation Monitor 833 may transmit a message for scaling a voltage magnitude to the DVS controller 831 or the voltage regulator 810.

FIG. 10 is a graph illustrating a delay value change according to a PVT corner. A delay value changes according to a PVT variation, as shown in FIG. 10. Therefore, a voltage supplied to each function block (each IP) may increase, maintain, and lower based on a PVT variation count value. FF, TT, and SS of FIG. 10 are a MOS characteristic according to a production process characteristic. FF is a Fast NMOS or a Fast PMOS, TT is a Typical NMOS or a Typical PMOS, and SS is a Slow NMOS or a Slow PMOS. A delay characteristic according to each MOS type is described with reference to FIG. 10.

Figure 11:
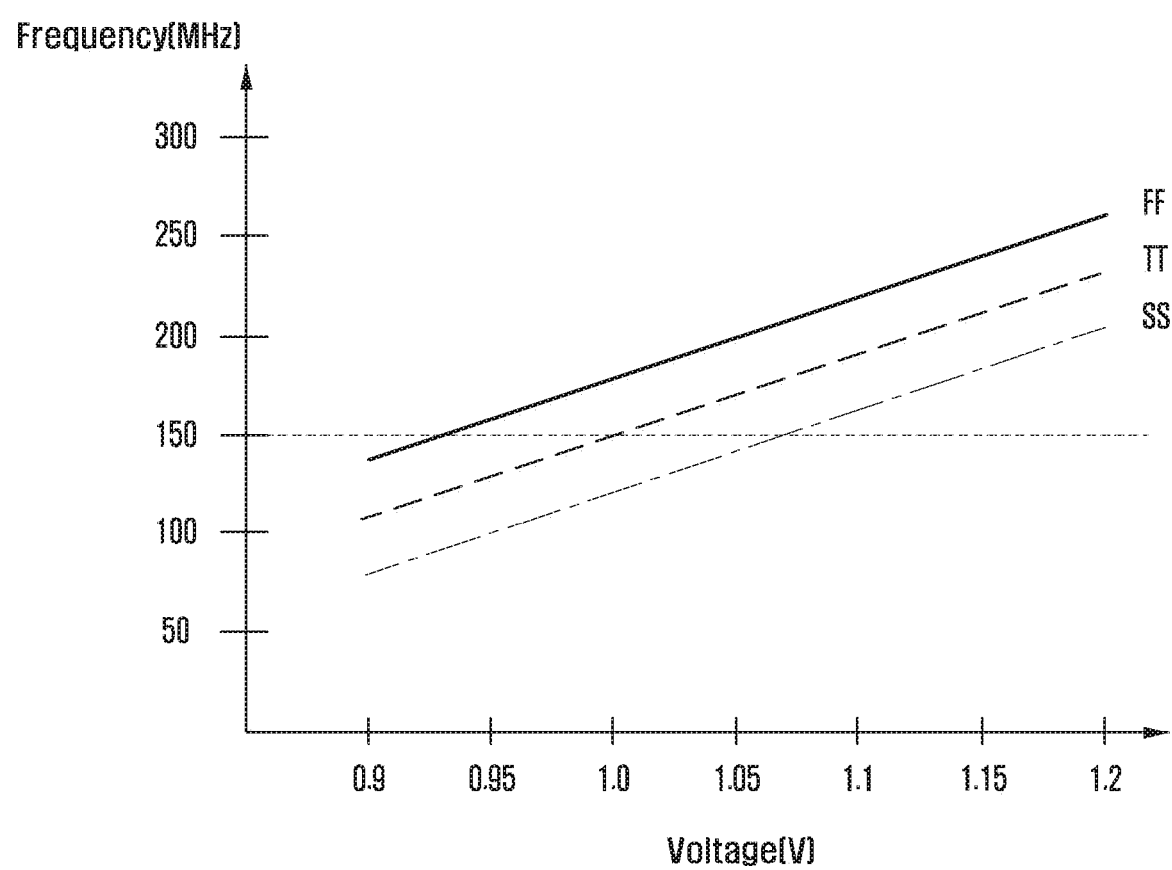
FIG. 11 is a graph illustrating a relationship between a voltage and a frequency according to a PVT corner.

FIG. 11 is a graph illustrating a relationship between a voltage and a frequency according to a PVT corner. Referring to FIG. 11, it is assumed that for example, a function block (e.g. IP) operates in a frequency of 150 MHz. When a PVT variation count value is 100, it is assumed that a supply voltage Vdd is 1.0V. In any function block, when a supply voltage is 1.0V and a PVT variation count value measured by a PVT variation is 150, it can be seen with reference to FIG. 10 that a process characteristic of the function block is an FF corner. Referring to a graph of FIG.

10, when an FF corner characteristic is FF, even if a voltage is lowered to 0.925V, the function block may operate with a frequency of 150 MHz. By such a method, a PVT variation characteristic may be determined based on a PVT variation count and a voltage may be scaled based on a MOS process characteristic. In this case, a voltage may be scaled in consideration of an operation frequency.

FIG. 9 is a block diagram illustrating a configuration of a PVT variation monitor according to an exemplary embodiment of the present invention. Referring to FIG. 9, a PVT variation monitor 900 may include an FSM 910, PVT variation clock generator 920, PVT variation counter 930, PVT TH-value Register 940, and comparator 950. An enable signal may be input to the PVT variation monitor 900 by register setting. When the enable signal is input, an FSM block may generate one cycle (38,461 ns) signal formed with TCXO CLK (26 MHz) stabilized in a temperature change. The signal may be input to the PVT variation clock generator 920 formed with an inverter and an AND GATE. In the PVT variation clock generator 920, a clock is generated while passing through each inverter circuit. The PVT variation counter 930 may operate using the generated clock. Because a delay value of an inverter chain changes according to a PVT variation, a clock frequency changes. A PVT variation count changes according to a change of a clock frequency, and a voltage scaling value is determined based on a comparison result of the comparator 950 according to a value previously set at the PVT threshold value register 940.

Figure 12:
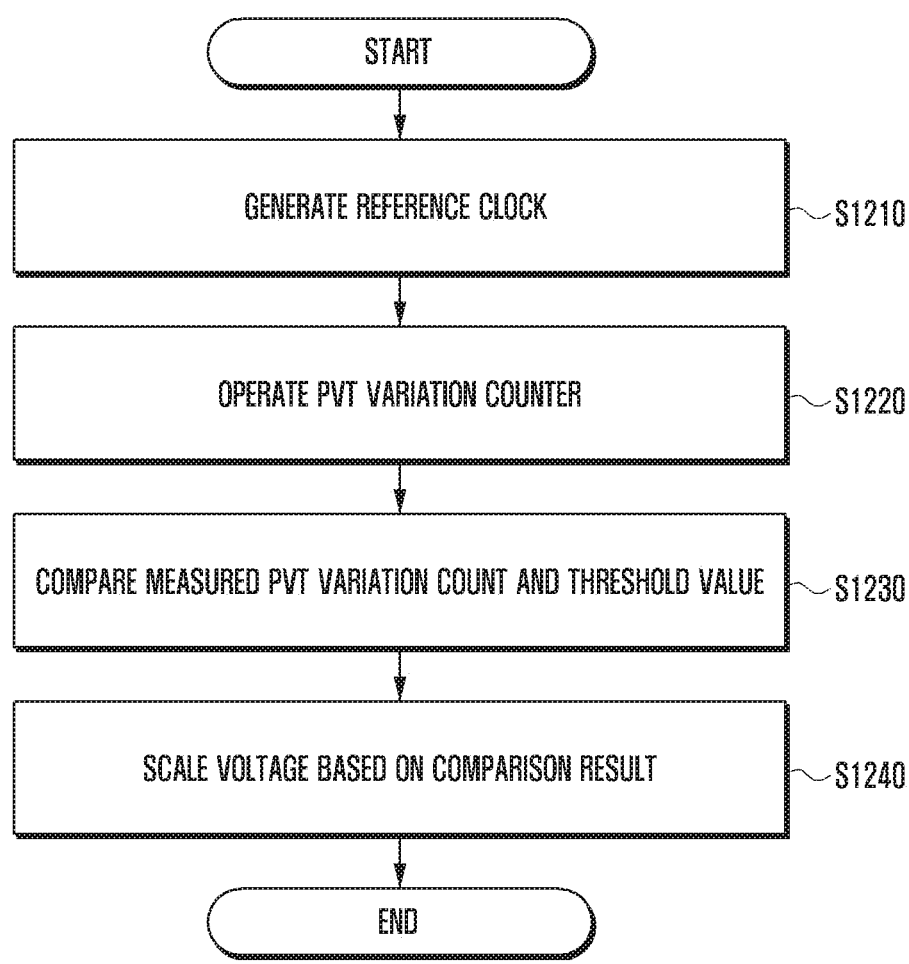
FIG. 12 is a flowchart illustrating a voltage scaling operation based on the SoC of FIG. 8.

FIG. 12 is a flowchart illustrating a voltage scaling operation based on the SoC of FIG. 8. Referring to FIG. 12, a reference clock may be generated at step S1210. When describing again a reference clock generation process, an enable signal may be input to the PVT variation monitor by register setting. When the enable signal is input, the FSM block may generate one cycle (38,461 ns) signal formed with TCXO CLK (26 MHz) stabilized in a temperature change. The signal may be input to a PVT variation clock generator formed with an inverter and an AND GATE. In the PVT variation clock generator, a reference clock is generated while passing through each inverter circuit.

The PVT variation counter may operate at step 1220. The PVT variation counter may operate using the generated reference clock. Because a delay value of the inverter chain changes according to a PVT variation, a frequency of the reference clock changes.

The comparator may compare a PVT variation count based on a reference clock and predetermined threshold value information at step 1230. A PVT variation count changes according to a frequency change of a reference clock, and the PVT variation count may be compared with a value previously set at the PVT threshold value register. The comparison may be performed in the comparator.

A voltage scaling value may be determined based on a comparison result of the PVT variation count and a value previously set at the PVT threshold value register at step 1240. A voltage magnitude of each function block may be scaled with such a method.

Figure 13:
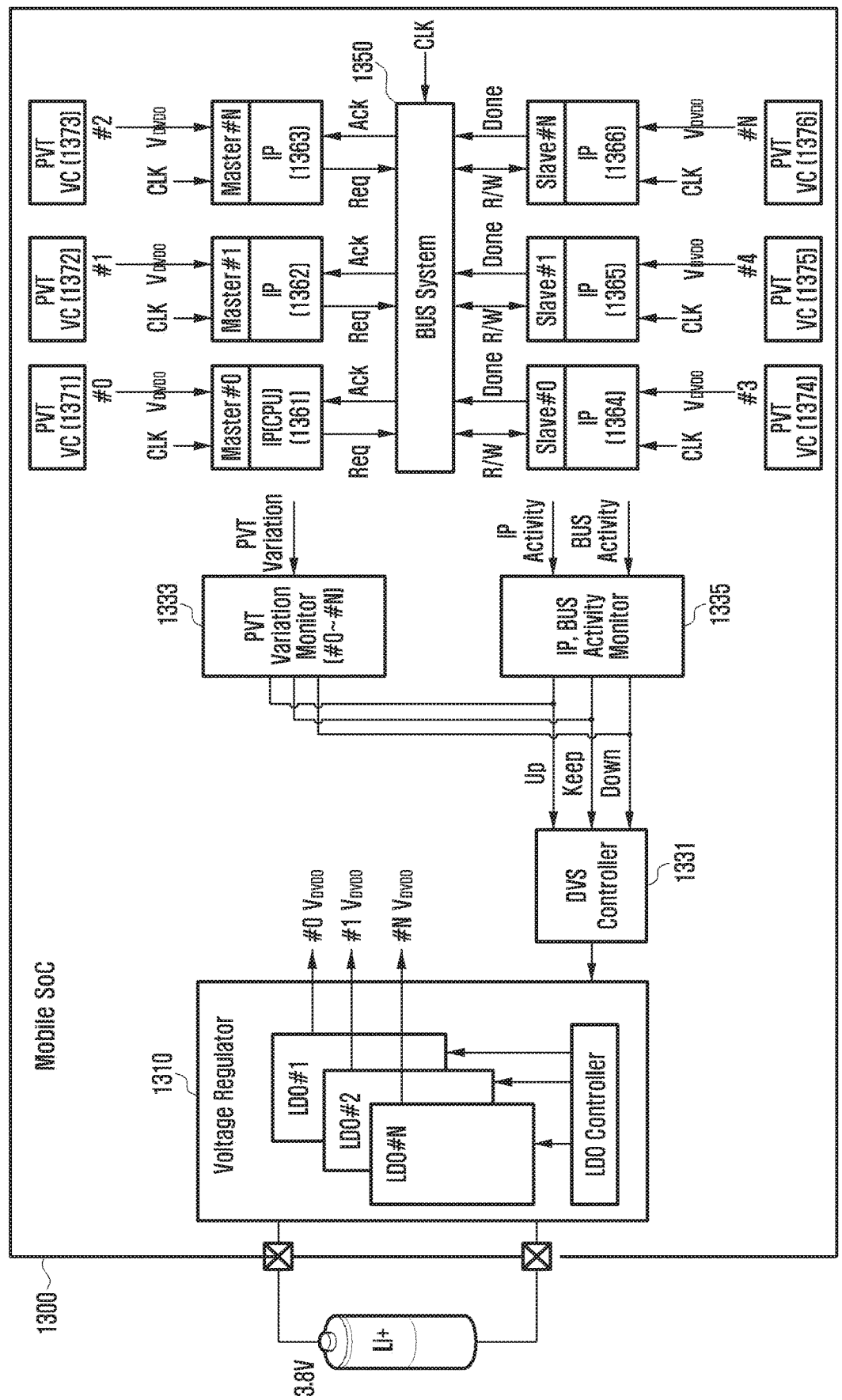
FIG. 13 is a block diagram illustrating a configuration of a SoC according to an exemplary embodiment of the present invention.

FIGS. 13 and 14 are a block diagram and a flowchart illustrating a configuration and operation of SoC according to an exemplary embodiment of the present invention. FIG. 13 is a block diagram illustrating a configuration of a SoC according to an exemplary embodiment of the present invention, and FIG. 14 is a flowchart illustrating a voltage scaling operation based on the SoC of FIG. 13.

Referring to FIG. 13, a SoC 1300 may be formed based on a combination of each exemplary embodiment of FIGS. 5 and 8. In an exemplary embodiment described with reference to FIG. 13, the SoC 1300 may simultaneously include a PVT variation monitor 1333 and an IP-BUS activity monitor 1335. Therefore, a voltage may be scaled according to whether each function block 1360 is activated and a voltage may be scaled based on a PVT variation count of each function block 1360. In the following description described with reference to FIGS. 13 and 14, constituent elements identical to or corresponding to those of FIGS. 5 and 8 are omitted.

Referring to FIG. 14, when data transmission and reception is performed between IPs, an activity counter of the IP-BUS activity monitor is reset to 0 at step S1410. Each IP uses a Bus Req signal while using a bus system.

The IP-BUS activity monitor may count a bus request value at step S1420. That is, the IP-BUS activity monitor may measure activity of the each IP.

The IP-BUS activity monitor may calculate the weighted sum of counted activity at a predetermined cycle interval at step S1430. The weighted sum calculation information may be referred to as combined activity information. The IP-BUS activity monitor may determine whether the weighted sum is 0 at step S1431. If the weighted sum is 0, an IP does not operate and thus the IP-BUS activity monitor may turn off at least one of a supplied frequency and voltage.

If the weighted sum is not 0 at step S1430, the process continues at step S1440. The IP-BUS activity monitor may compare an activity measurement value with a predetermined threshold value at steps S1440 and S1450. The IP-BUS activity monitor may compare an activity measurement value and a threshold value. For example, the IP-BUS activity monitor may compare the combined activity value with a predetermined threshold value. The threshold value may include a lower threshold and a high threshold. In FIG. 14, an activity value is first compared with a lower threshold at step S1440, but an activity value may be first compared with a high threshold. The IP-BUS activity monitor may compare an activity value and a predetermined lower threshold at step S1440.

The comparator may compare the measured PVT variation count with a predetermined threshold value at steps S1445 and S1555. That is, the comparator may compare a PVT variation count based on a reference clock and predetermined threshold value information. A PVT variation count may change according to a change of a frequency of a reference clock, and the comparator may compare the PVT variation count with a value previously set at a PVT threshold value register. The comparison may be performed in the comparator. Further, a voltage scaling value may be determined based on a comparison result of the PVT variation count and a value previously set at the PVT threshold value register.

If an activity measurement value is greater than a lower threshold at step S1440 and if an activity measurement value is smaller than a high threshold at step S1450, the controller may control to maintain a present frequency and a present voltage. If an activity measurement value is greater than a high threshold at step S1450, the process continues at step S1455, and the controller compares a PVT variation measurement value with a predetermined high threshold at step S1455, and if a PVT variation measurement value is greater than or equal to a predetermined high threshold, the controller controls to increase a value of at least one of a present frequency and a present voltage. If a PVT variation measurement value is smaller than a predetermined high threshold at step S1455, the controller controls to maintain a present frequency and voltage.

If an activity measurement value is equal to or smaller than a lower threshold at step S1440 and if a PVT variation measurement value is equal to or smaller than a predetermined lower threshold at step S1445, the controller may control to lower at least one of a present frequency and voltage. If a PVT variation measurement value is equal to or greater than a predetermined lower threshold at step S1445, the process continues at step S1455, and the controller may compare a PVT variation measurement value with a predetermined high threshold at step S1455, and if a PVT variation measurement value is equal to or greater than a predetermined high threshold, the controller may control to increase at least one value of a present frequency and a present voltage. If a PVT variation measurement value is smaller than a predetermined high threshold at step S1455, the controller may control to maintain a present frequency and voltage.

A voltage of each function block or each IP may be scaled with the foregoing method. A description described with reference to FIG. 14 is described in order of determining activity and determining a PVT variation count, but the present invention is not limited thereto and an exemplary embodiment that determines a PVT variation count and a predetermined threshold value and that compares activity of a function block with a predetermined threshold value and that scales a voltage or a frequency may be performed.

In the foregoing exemplary embodiment, a method of generally scaling a voltage has been described. This describes Dynamic Voltage Scaling (DVS) suggested in an exemplary embodiment of the present invention and does not exclude frequency scaling.

The following Table represents an effect of power consumption according to an exemplary embodiment of the present invention.

| IP Block | 1.0 V | 1.0 V (DFS) | 0.9 V (DVS) |
|---|---|---|---|
| CPU_SYS | 84.25 | 65.02 | 69.2425 |
| DSP_SYS | 5.27 | 5.27 | 4.3 |
| MODEM_SYS | 308.31 | 296.08 | 250.7311 |
| Total | 397.83 | 366.37 | 324.2736 |
| efficiency | | 7.907900359% | 18.48940502% |

In Table, power consumption efficiency of a case of inputting a constant voltage of 1.0V, a case of performing DFS while inputting a constant voltage of 1.0V, and a case of inputting 0.9V through DVS is compared. As each IP block, a CPU, DSP, and modem were exemplified. When using a DFS method based on a case of inputting a constant voltage of 1.0V, power efficiency of 7.9% was obtained, and when using a method of dynamically scaling a voltage based on a case of inputting a constant voltage of 1.0V, power efficiency of 18.49% was obtained. Therefore, when using a method of dynamically scaling a voltage, it can be seen that power consumption efficiency is most excellent.

As described above, according to an exemplary embodiment of the present invention, by newly applying a PVT variation monitor and an IP activity monitor for a low power SoC, activity of each IP may be measured. Further, an optimal voltage can be supplied at a desired time point according to whether activity of each IP exists using a housed voltage regulator. By stopping power supply to an IP that does not operate, power consumption can be minimized. Therefore, operation information of an entire system and voltage control technology based on a PVT variation of the present invention can largely contribute to power efficiency of a Mobile SoC.

Exemplary embodiments disclosed in this specification and drawings are suggested as a specific example to easily describe the present invention and to help understanding thereof and do not limit the scope of the present invention. Therefore, it should be understood that changes and variations obtained based on the spirit and scope of the present invention in addition to exemplary embodiments disclosed herein are included in the scope of the present invention.

The invention claimed is:

1. A System on Chip (SoC) comprising at least one function block and a bus, the SoC comprising:
   a bus activity monitor configured to:
      reset a value of an activity counter for a first function block as 0, in case that a data transmission is initiated between the first function block and a second function block from a plurality of function blocks,
      count requests to a bus for communicating with the first function block from the second function block, the value of the activity counter being increased based on the counted requests from 0,
      measure activity of the first function block based on the value of the activity counter,
      compare a value of the measured activity with a lower threshold value and a higher threshold value,
      generate a first voltage control signal to reduce a voltage for the first function block, in case that the value of the measured activity is lower than the lower threshold value,
      generate a second voltage control signal to increase the voltage for the first function block, in case that the value of the measured activity is higher than the higher threshold value, and
      generate a third voltage control signal to maintain the voltage for the first function block, in case that the value of the measured activity is higher than the lower threshold value and lower than the higher threshold value;
   a process, voltage, and temperature (PVT) variation monitor configured to generate a fourth voltage control signal based on a PVT variation characteristic of the at least one function block; and
   a voltage regulator configured to supply voltage to the first function block based on the first voltage control signal, the second voltage control signal, the third voltage control signal, and the fourth voltage control signal.

2. The SoC of claim 1, wherein the voltage regulator is housed in the SoC.

3. The SoC of claim 1, further comprising a dynamic voltage controller (DVC) connected between the bus activity monitor and the voltage regulator and configured to transfer the at least one of the first voltage control signal, the second voltage control signal, the third voltage control signal, and the fourth voltage control signal to the voltage regulator.

4. The SoC of claim 1, wherein the activity is measured based on a number of request signals transmitted to the bus from the second function block for communicating with the first function block.

5. The SoC of claim 1, wherein the bus activity monitor is further configured to:
   measure a weighted sum of the activity for a predetermined period, generate the first voltage control signal that lowers a supply voltage, if the weighted sum is less than a low activity threshold value, and
generate the first voltage control signal that increases the supply voltage, if the weighted sum is greater than a high activity threshold value.

6. The SoC of claim 1, wherein the PVT variation monitor is further configured to:
transmit the at least one fourth voltage control signal to the voltage regulator.

7. The SoC of claim 6, further comprising a PVT variation counter configured to measure a PVT variation count of the plurality of the function blocks based on the PVT variation.

8. The SoC of claim 7, wherein the PVT variation monitor is further configured to:
generate an input signal based on a signal stabilized in a temperature change,
operate the PVT variation counter with a reference clock that is generated based on the input signal, and
measure the PVT variation count based on a frequency change of the reference clock based on a PVT variation of the at least one function block.

9. The SoC of claim 8, wherein the PVT variation monitor is further configured to:
generate the at least one fourth voltage control signal that lowers a supply voltage, if the PVT variation count is less than a low PVT threshold value, and
generate the at least one fourth voltage control signal that increases the supply voltage, if the PVT variation count is greater than a high activity threshold value.

10. The SoC of claim 6, wherein the PVT variation characteristic of the plurality of the function blocks include a physical characteristic associated with a production process characteristic.

11. A method of controlling power of a System on Chip (SoC) comprising at least one function block and a bus, the method comprising:
resetting a value of an activity counter for a first function block as 0, in case that a data transmission is initiated between the first function block and a second function block from a plurality of function blocks;
counting requests to a bus for communicating with the first function block from the second function block, the value of the activity counter being increased based on the counted requests from 0;
measuring activity of the first function block based on the value of the activity counter;
comparing a value of the measured activity with a lower threshold value and a higher threshold value;
generating a first voltage control signal to reduce a voltage for the first function block, in case that the value of the measured activity is lower than the lower threshold value;
generating a second voltage control signal to increase the voltage for the first function block, in case that the value of the measured activity is higher than the higher threshold value;
generating a third voltage control signal to maintain the voltage for the first function block, in case that the value of the measured activity is higher than the lower threshold value and lower than the higher threshold value;
generating a fourth voltage control signal based on a PVT variation characteristic of the at least one function block; and
supplying voltage to the first function block based on the first voltage control signal, the second voltage control signal, the third voltage control signal, and the fourth voltage control signal.

12. The method of claim 11, wherein a voltage regulator that supplies a voltage to each of the at least one function block is housed in the SoC.

13. The method of claim 11, further comprising transferring, using a dynamic voltage controller (DVC), the first voltage control signal to a voltage regulator.

14. The method of claim 11, wherein the activity is measured based on a number of request signals transmitted to the bus from the second function block for communicating with the first function block.

15. The method of claim 14, wherein the generating of the first voltage control signal for the at least one function block comprises:
measuring a weighted sum of the activity for a predetermined period;
generating, if the weighted sum is less than a low activity threshold value, the first voltage control signal that lowers a supply voltage; and
generating, if the weighted sum is greater than a high activity threshold value, the first voltage control signal that increases the supply voltage.

16. The method of claim 11, further comprising:
supplying voltage to the first function block based on the at least one fourth voltage control signal.

17. The method of claim 16, wherein generating of the at least one second voltage control signal further comprises measuring a PVT variation count of the plurality of the function blocks based on the PVT variation.

18. The method of claim 17, wherein generating of the at least one second voltage control signal further comprises:
generating an input signal based on a signal stabilized in a temperature change;
operating a PVT variation counter with a reference clock that is generated based on the input signal; and
measuring the PVT variation count based on a frequency change of the reference clock based on a PVT variation of the at least one function block.

19. The method of claim 18, further comprising:
generating, if the PVT variation count is less than a low threshold value, the at least one fourth voltage control signal that lowers a supply voltage; and
generating, if the PVT variation counter is greater than a high activity threshold value, the at least one fourth voltage control signal that increases the supply voltage.

20. The method of claim 16, wherein the PVT variation characteristic of the plurality of the function blocks include a physical characteristic associated with a production process characteristic.

* * * * *